United States Patent
Zhao et al.

(10) Patent No.: US 9,998,358 B2
(45) Date of Patent: Jun. 12, 2018

(54) CAPACITIVE BUILT-IN TOUCH CONTROL DISPLAY PANEL WITH COMMON ELECTRODE AND TOUCH CONTROL DRIVING ELECTRODE IN THE SAME LAYER, CONTROL DEVICE AND CONTROL METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 247 days.

(21) Appl. No.: 14/355,489

(22) PCT Filed: May 30, 2013

(86) PCT No.: PCT/CN2013/076499
§ 371 (c)(1),
(2) Date: Apr. 30, 2014

(87) PCT Pub. No.: WO2014/153830
PCT Pub. Date: Oct. 2, 2014

(65) Prior Publication Data
US 2016/0077624 A1 Mar. 17, 2016

(30) Foreign Application Priority Data
Mar. 29, 2013 (CN) .......................... 2013 1 0108265

(51) Int. Cl.
*G06F 5/00* (2006.01)
*H04L 12/709* (2013.01)
(Continued)

(52) U.S. Cl.
CPC ............ *H04L 45/245* (2013.01); *G06F 3/044* (2013.01); *H04L 61/103* (2013.01); *Y02B 60/33* (2013.01); *Y02D 50/30* (2018.01)

(58) Field of Classification Search
CPC . G06F 2203/04107; G06F 2203/04111; G06F 2203/04112
(Continued)

(56) References Cited

U.S. PATENT DOCUMENTS

| | | | | |
|---|---|---|---|---|
| 2008/0062148 A1* | 3/2008 | Hotelling | ............ | G02F 1/13338 345/174 |
| 2010/0110038 A1* | 5/2010 | Mo | ........................ | G06F 3/044 345/174 |
| 2011/0102370 A1* | 5/2011 | Kono | ...................... | G06F 3/044 345/174 |
| 2011/0210935 A1* | 9/2011 | Chuang | ................. | G06F 3/0412 345/174 |

(Continued)

FOREIGN PATENT DOCUMENTS

| | | | |
|---|---|---|---|
| CN | 102109690 A | 6/2011 | |
| CN | 102419669 A | 4/2012 | |

(Continued)

OTHER PUBLICATIONS

International Search Report dated Jan. 9, 2014; PCT/CN2013/076499.
(Continued)

*Primary Examiner* — Ram Mistry
(74) *Attorney, Agent, or Firm* — Ladas & Parry LLP; Loren K. Thompson

(57) ABSTRACT

The invention discloses a capacitive built-in touch control display panel, a display device, a control device and method with a purpose of realizing display and touch control functions of the display panel without an additional touch panel, which simplifies the configuration of the capacitive built-in
(Continued)

touch control display panel and improves the light transmittance. A capacitive built-in touch control display panel provided by the embodiment of the invention comprises an array substrate, an counter substrate and a liquid crystal layer, wherein the array substrate comprises a gate line and a data line disposed as intersecting each other and a transparent common electrode layer; the array substrate further comprises a touch control driving electrode positioned in the transparent common electrode layer and extending along a first direction, and a touch control detecting electrode insulated from the touch control driving electrode by way of an insulation layer and extending along a second direction; the first direction is perpendicular to the second direction, a common voltage signal and a touch control driving signal are applied to the touch control driving electrode in a time dividing manner.

9 Claims, 4 Drawing Sheets

(51) Int. Cl.
    *G06F 3/044*     (2006.01)
    *H04L 29/12*     (2006.01)

(58) Field of Classification Search
    USPC ........................................ 345/156, 173–178
    See application file for complete search history.

(56) References Cited

U.S. PATENT DOCUMENTS

| | | | | |
|---|---|---|---|---|
| 2012/0075239 | A1* | 3/2012 | Azumi | .................... G06F 3/044 345/174 |
| 2013/0154977 | A1* | 6/2013 | Lee | ......................... G02F 1/133 345/173 |
| 2013/0313098 | A1* | 11/2013 | Chang | ..................... G06F 3/044 200/600 |
| 2014/0071066 | A1* | 3/2014 | Lee | ........................ G06F 3/0416 345/173 |

FOREIGN PATENT DOCUMENTS

| | | |
|---|---|---|
| CN | 102841718 A | 12/2012 |
| CN | 102914920 A | 2/2013 |
| CN | 202736009 A | 2/2013 |
| CN | 202838292 U | 3/2013 |

OTHER PUBLICATIONS

First Chinese Office Action dated Jun. 2, 2015; Appln. No. 201310108265.9.
English abstract of CN202838292U.
English abstract of CN102419669A.
English abstract of CN102109690A.
Written Opinion of International Searching Authority (English language), in PCT Application No. PCT/CN2013/076499, dated Jan. 9, 2014; 6 pages.
Second Chinese Office Action dated Jan. 4, 2016; Appln. No. 201310108265.9.

* cited by examiner

CAPACITIVE BUILT-IN TOUCH CONTROL DISPLAY PANEL WITH COMMON ELECTRODE AND TOUCH CONTROL DRIVING ELECTRODE IN THE SAME LAYER, CONTROL DEVICE AND CONTROL METHOD

CROSS REFERENCE TO RELATED APPLICATIONS

This application is based on International Application No. PCT/CN2013/076499 filed on May 30, 2013, which claims priority to Chinese National Application No. 201310108265.9 filed on Mar. 29, 2013. The entire contents of each and every foregoing application are incorporated herein by reference.

FIELD OF THE ART

The present disclosure relates to a field of liquid crystal technologies; more particularly, to a capacitive built-in touch control display panel, a display device, a control device and a control method.

BACKGROUND

A conventional Advanced Super Dimension Switch (ADS) liquid crystal display (LCD) display module has a shielding ITO outside the color filter substrate for preventing external interference signals from entering the electric field in the liquid crystal display, thereby ensuring the normal display of the LCD display module. For example, two transparent electrodes are disposed on an array substrate of a conventional ADS LCD, so that an electric field is generated at edges of slit electrodes on a same plane and an electric field is generated between a slit electrode layer and a plate electrode layer so as to form a multi-dimensional electric field, so that liquid crystal molecules at all orientations, which are located directly above the electrodes and between the slit electrodes in a liquid crystal cell, can be rotated, thereby enhancing operation efficiency of liquid crystals and increasing light transmittance.

As illustrated in FIG. 1, a basic configuration of a conventional LCD comprises: an upper polarizer 201, a shielding ITO 30, a color filter substrate, an upper alignment layer 501, a liquid crystal layer 12, a lower alignment layer 502, an array substrate and a lower polarizer 202. Herein the color filter substrate comprises a glass substrate 10, a color filter layer 40 comprising color filters RGB and a black matrix). The array substrate comprises a base substrate 130, and a gate line 131, a data line 132 formed on the base substrate 130. The gate line 131 and the data line 132 are disposed in different levels with a first insulation layer 60 disposed there-between.

Based on the above configuration, a capacitive touch control method is achieved typically by attaching a touch control function unit on the upper polarizer, which requires the bonding of a glass substrate fabricated with a touch sensor electrode. Such implementation is costly, has low yield due to addition of attaching process and large thickness so as to compromise the transmittivity.

SUMMARY

Embodiments of the invention provide a capacitive built-in touch control display panel, a display device, a control device and a control method, which can provide display and touch control functions for the display panel without the additional touch panel, thereby simplifying the configuration of the capacitive built-in touch control display panel and improving the light transmittance.

An embodiment of the invention provides a capacitive built-in touch control display panel, comprising an array substrate, an counter substrate and a liquid crystal layer, the array substrate comprising a gate line and a data line extending in different directions and crossing each other and a transparent common electrode layer.

The array substrate further comprising: a touch control driving electrode extending along a first direction, the touch control driving electrode being positioned in the transparent common electrode layer; and a touch control detecting electrode extending along a second direction, the touch control detecting electrode being insulated from the touch control driving electrode by an insulation layer. The first direction is perpendicular to the second direction, a common voltage signal and a touch control driving signal are applied to the touch control driving electrode in a time dividing manner.

An embodiment of the invention provides a control method for realizing display and touch control functions of the above capacitive built-in touch control display panel. The method comprises: dividing a period for displaying each image frame by the display panel into a display period and a touch control period; applying a common voltage signal to the touch control driving electrode without applying signal to the touch control detecting electrode during the display period; and applying a touch control driving signal to the touch control driving electrode and the touch control detecting electrode coupling and outputting a voltage signal of the touch control driving electrode during the touch control period.

An embodiment of the invention provides a control device for realizing display and touch control functions of the capacitive built-in touch control display panel, a period for displaying each image frame by the display panel is divided into a display period and a touch control period. The control device comprises a display control unit adapted to apply a common voltage signal to the touch control driving electrode without inputting signals to the touch control detecting electrode during the display period; and a touch control unit adapted to apply a touch control driving signal to the touch control driving electrode and control the touch control detecting electrode couples and outputs the voltage signal of the touch control driving electrode during the touch control period.

An embodiment of the invention provides a display device comprising the capacitive built-in touch control display panel.

The capacitive built-in touch control display panel, the display device, the control device and the control method according to the embodiments of the invention allow a part of the common electrode in the transparent common electrode layer to serve as the common electrode and the touch control driving electrode respectively in different periods by applying different signals to the part of the common electrode in a time dividing manner. In this means, it ensures the normal image display by the touch control display panel and makes full use of the existing electrode structure without an additional touch control driving electrode. It can not only realize touch control function of the display panel but also increase the aperture ratio of the capacitive touch control display panel.

BRIEF DESCRIPTION OF THE DRAWINGS

In order to clearly illustrate the technical solution of the embodiments of the invention, the drawings of the embodiments will be briefly described as following. It is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

Embodiments of the invention provide a capacitive built-in touch control display panel, a display device, a control device and a control method, which can provide display and touch control functions for the display panel without additional touch control panel, thereby simplifying the configuration of the capacitive built-in touch control display panel and improving the light transmittance.

The invention will be described as following with reference to the drawings. It is noted that the drawings are schematic configurations only and are not drawn to scale. The drawings are used to illustrate the invention more clearly, instead of limiting the invention.

Figure 1:
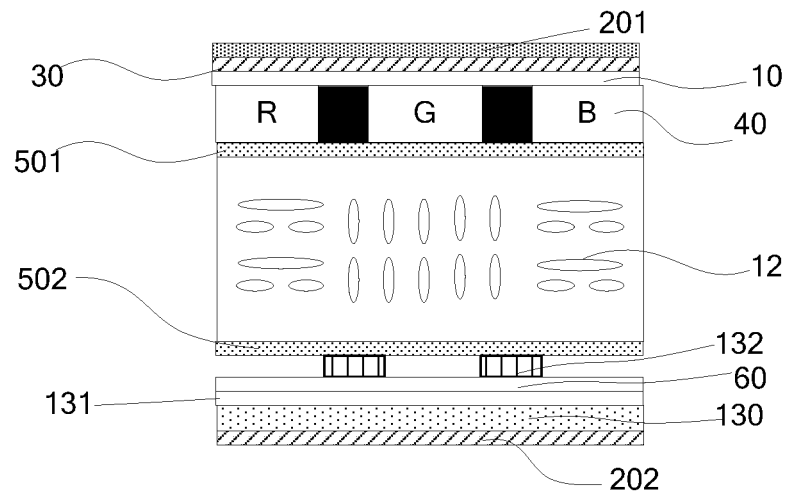
FIG. 1 schematically illustrates a configuration of a display panel of a conventional LCD product.
Figure 2:
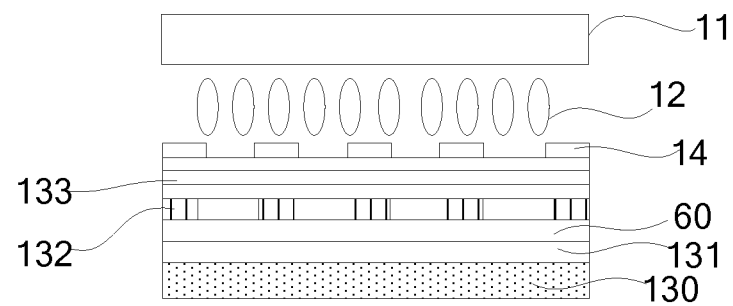
FIG. 2 schematically illustrates a configuration of a display panel in accordance with an embodiment of the invention.

Referring FIG. 2, a capacitive built-in touch control display panel according to an embodiment of the invention comprises a counter substrate 11, an array substrate, and a liquid crystal layer 12 disposed between the counter substrate 11 and the array substrate. The TFT array substrate comprises a gate line 131 and a data line 132 extending in different directions and crossing each other and formed on a base substrate 130, and a common electrode layer 133. The gate line 131 and the data line 132 are disposed in different layers with a first insulation layer 60 disposed therebetween.

The array substrate further comprises: a touch control driving electrode extending along a first direction and positioned in the transparent common electrode layer 133; and a touch control detecting electrode 14 extending along a second direction and insulated from the touch control driving electrode by a second insulation layer (not shown).

The first direction is perpendicular to the second direction, that is, the touch control driving electrode is perpendicular to the touch control detecting electrode, a common voltage signal and a touch control driving signal are applied to the touch control driving electrode in a time dividing manner.

The aforementioned first direction and second direction will not be specifically defined herein. For example, the first direction can be an extending direction of the gate line, and the second direction can be an extending direction of the data line. Alternatively, the first direction can be an extending direction of the data line; and the second direction is an extending direction of the gate line.

In an example of the above display panel, the common electrode layer 133 comprises a plurality of strip-like common electrodes. Since pixel resolution of the touch control structure is smaller than that of the display panel, a part of the plurality of strip-like common electrodes are used as the touch control driving electrode in the example of the invention. For example, every other common electrodes of the plurality of strip-like common electrodes can be selected as the touch control driving electrode. It can be conceivable that one of every other two or three common electrodes can be selected as the touch control driving electrode. For example, the strip-like common electrodes can be selected as the touch control driving electrode according to the required touch control resolution. Thus, no additional touch control detecting electrode is required.

For example, the touch control detecting electrode has a grid structure and is made of metal. The grid-like touch control detecting electrode is in a position corresponding to the black matrix, that is, the grid-like touch control detecting electrode corresponds to a wiring regions of the gate line and the data lines. Therefore, no extra shielding is required in the region corresponding to the touch control detecting electrode either, which further improves the aperture ratio of the capacitive touch control display panel.

An example of the touch control driving electrode being disposed along the gate line direction and the touch control detecting electrode being disposed along the data line direction is described in the embodiment and the corresponding drawing. The display panel can further comprise for example a metal electrode 15 (see FIG. 3) disposed above or under the touch control driving electrode and electrically connected to the touch control driving electrode. The metal electrode 15 can be in direct contact with the touch control driving electrode. As the transparent common electrode layer in the embodiment is generally made of an ITO material, the disposition of the metal electrode 15 above or below the touch control driving electrode can greatly reduce the overall resistance of the touch control driving electrode.

The metal electrode can have for example a grid-like structure and a position of the grid-like metal electrode corresponds to the black matrix. Similarly, since the metal electrode connected to the touch control driving electrode also corresponds to the wiring regions of the gate line and/or the data line, the aperture ratio of the touch control display panel will not be affected.

Furthermore, the invention will be described in detail with reference to the drawings and the detailed embodiments.

Figure 3:
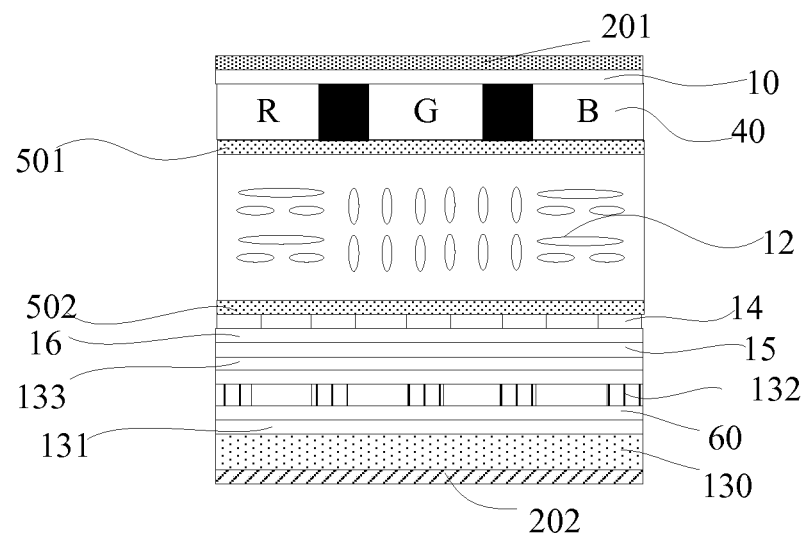
FIG. 3 illustrates a detailed configuration of the configuration of FIG. 2.

FIGS. 2 and 3 show a schematic configuration of a capacitive built-in touch control display panel according to the invention. The display panel comprises a counter substrate 11, a liquid crystal layer 12, and an array substrate formed with a touch control driving electrode and a touch control detecting electrode 14 thereon.

For example, the counter substrate 11 comprises a glass substrate 10 and a color filter layer 40. An upper polarizer 201 is disposed on the outer side of the counter substrate 11, and a upper alignment layer 501 is disposed on its inner side.

It is noted that in the present example the color filter layer 40 is disposed on the counter substrate, in this case the counter substrate is also referred as the color filter substrate. Moreover, the color filter layer can also be fabricated on the array substrate by using the Color Filter On Array (COA) technology.

The above array substrate comprises a base substrate 130, a gate line 131, a data line 132 and a transparent common electrode layer 133 formed on the base substrate 130, and a lower alignment layer 502 disposed on the touch control detecting electrode and a lower polarizer 202 disposed under the base substrate 130.

Figure 4:
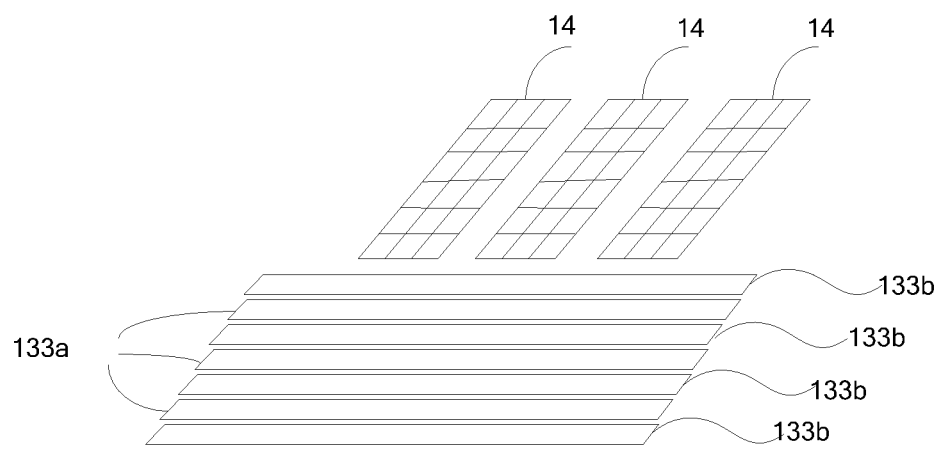
FIG. 4 schematically illustrates a laminated configuration of a touch control detecting electrode and a touch control driving electrode of a capacitive built-in display panel in accordance with an embodiment of the invention.

Herein the common electrode layer 133 comprises common electrodes 133a (see FIG. 4) and touch control driving electrodes 133b (see FIG. 4). A common voltage signal and a touch control driving signal are applied to the touch control driving electrodes 133b in a time dividing manner. In an example, the common voltage signal is applied to the touch control driving electrodes 133b during a display period, the touch control driving electrodes 133b serves as the common electrode and controls the rotation of the liquid crystal together with the pixel electrode. The touch control driving signal is applied to the touch control driving electrodes 133b during a touch control period, the touch control detecting electrode 14 couples and outputs the voltage signal of the touch control driving signal. A touch control detecting module in the peripheral region can detect a specific location corresponding to the touch event upon detecting the coupled signal output by the touch control detecting electrode 14, thereby achieving accurate touch control positioning.

The common electrodes 133a are only connected to the common voltage signal and are configured to control rotations of the liquid crystals together with the pixel electrode.

Figure 5:
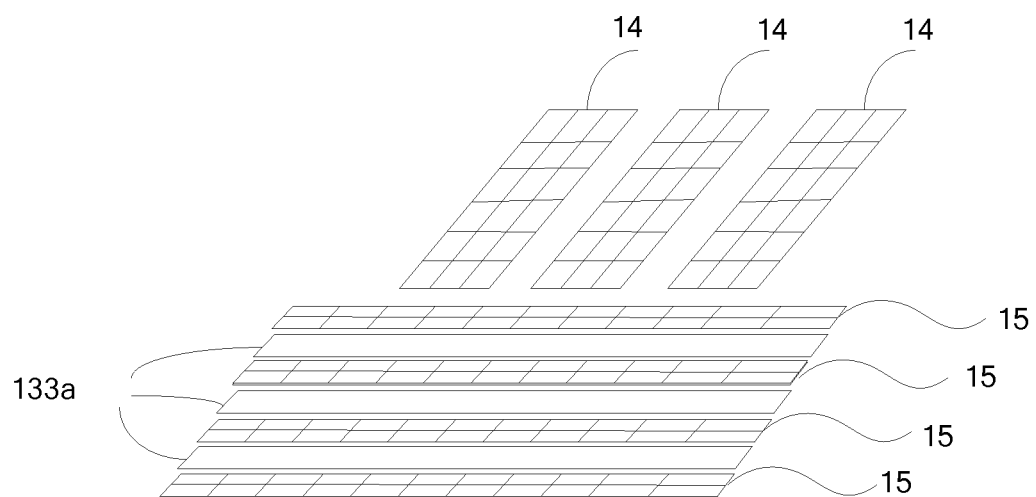
FIG. 5 schematically illustrates a laminated configuration of a touch control detecting electrode and a touch control driving electrode of another capacitive built-in display panel in accordance with another embodiment of the invention.

The touch control driving electrode 133b can be made of a transparent conductive material such as ITO. The touch control driving electrode has a large resistance in its extending direction, which can impede the transmission of signals. As illustrated in FIG. 5, in order to improve the quality of signal transmission, for example, a metal electrode 15 can be disposed above the touch control driving electrode, and the metal electrode 15 is electrically connected to the touch control driving electrode 133b.

For example, the metal electrode 15 has a grid-like structure disposed in a location corresponding to the black matrix region and under the black matrix region.

The array substrate further comprises a passivation layer 16 disposed above the metal electrode for insulating the touch electrode from other electrodes. The passivation layer 16 is made of a resin material. However, the passivation layer can also be made of other materials, as long as the materials are transparent insulating materials.

As shown in FIG. 3 and FIG. 4, the touch control detecting electrode 14 is disposed above the passivation layer 16 and can have a grid-like structure. Moreover, the grid-like touch control detecting electrode extends along the direction of the data line.

Since the touch control driving electrodes 133b correspond to the black matrix region, no extra shielding is required for the touch control driving electrode, thereby increasing the aperture ratio after disposing the gate line 131 and the data line 132 and improving the display quality. Furthermore, the touch control detecting electrode 14 and the touch control driving electrode 133b are disposed on the side of the array substrate side, which can facilitate to fan out the leads of the touch control detecting electrode and the touch control driving electrode, which is in turn beneficial for the bonding of the flexible print circuit (FPC).

FIG. 4 schematically illustrates a laminated configuration of the touch control detecting electrode and the touch control driving electrode of a capacitive built-in display panel. Herein the touch control detecting electrode 14 extends along the direction of the data line in the TFT array substrate, and the touch control driving electrode 133b extends in a direction perpendicular to that of the touch control detecting electrode. Touch control driving electrodes 133b are parallel to each other and a common electrode 133a is disposed between two adjacent touch control driving electrodes 133b. During a touch control period, the touch control detecting electrodes are respectively connected to the touch control detecting signal (such as a DC current), the touch control driving electrodes are respectively connected to the touch control driving signal. The common electrode layer including the common electrodes 133a and the touch control driving electrodes 133b has a planar structure. Generally, the common electrode layer covers the surface of the whole array substrate and is made of ITO. The configuration and materials of the common electrode layer can be conventional and will not be elaborated herein.

Furthermore, as illustrated in FIG. 5, a grid-like metal electrode is disposed above the touch control driving electrode 133b, the metal electrode is electrically connected to the touch control driving electrode 133b and positioned corresponding to the black matrix region under the black matrix region. In this way, a metal electrode for electrical connection is added. Since the metal electrode is made of a metal material and has a much smaller resistance in comparison with the common electrode made of ITO, the resistance of the touch control driving electrode is eventually made much smaller after being connected to the metal electrode in parallel. It thus effectively reduces the load of the touch control chip and improves the touch control resolution. The density of the metal electrode can be designed in advance according to the display resolution so as to meet different display requirements.

Moreover, the metal electrode is disposed above the touch control driving electrode and has the same shape as the touch control driving electrode with its location corresponding to the black matrix region; therefore the transmittivity will not be affected, and no extra shielding is introduced for the metal electrode.

The invention provides a control method for realizing display and touch control of the display panel. The control method comprises: dividing a period for displaying each image frame by the display panel into a display period and a touch control period. During the display period, a common voltage signal is applied to the touch control driving electrode while no signal is applied to the touch control detecting electrode. During the touch control period, a touch control driving signal is applied to the touch control driving electrode, the touch control detecting electrode couples and outputs a voltage signal of the touch control driving electrode.

Figure 6:
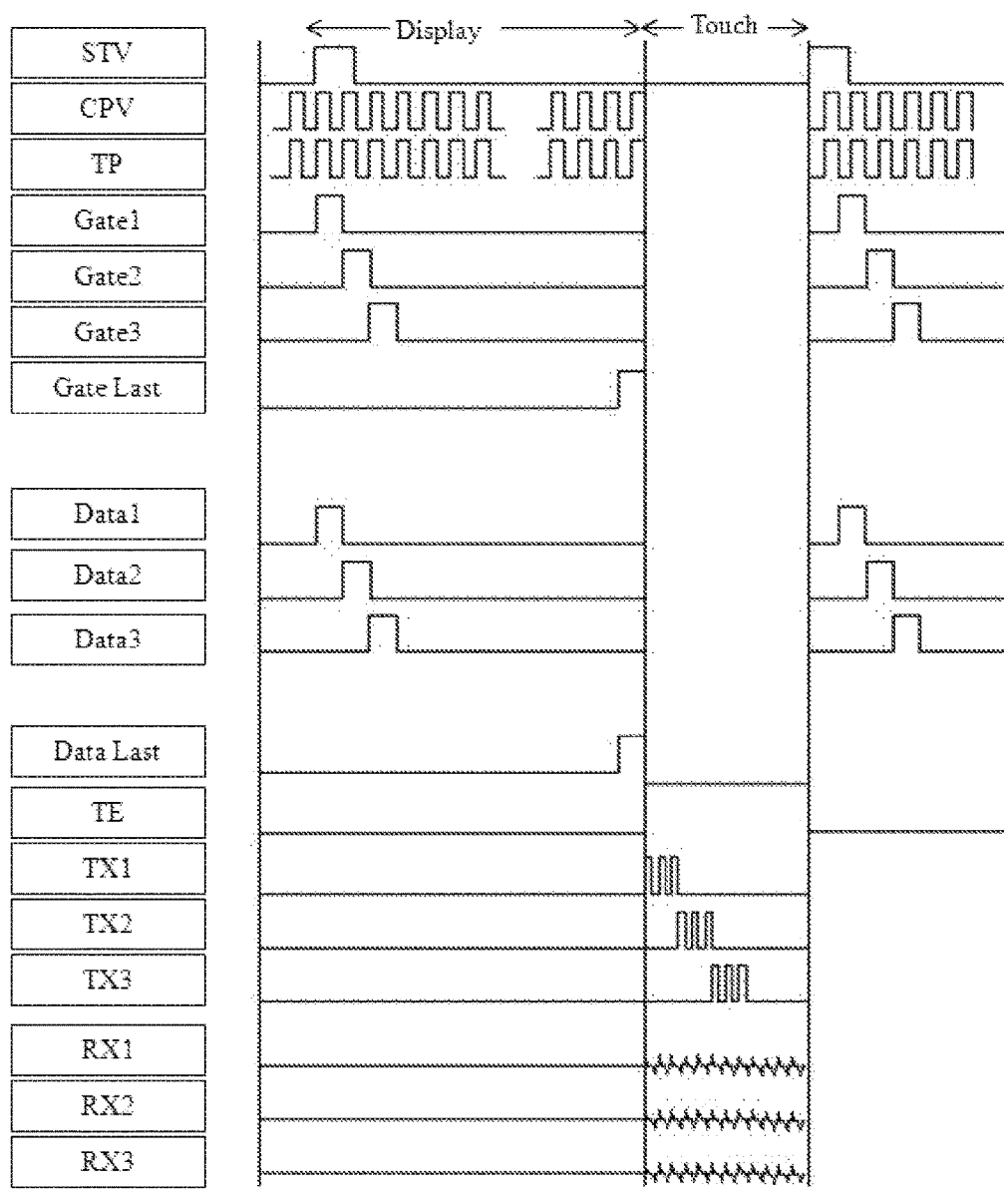
FIG. 6 illustrates timing charts of respective signal terminals for display and touch control of a touch control display panel in accordance with an embodiment of the invention.

Further, a period for each image frame is divided into a display period Display and a touch control period Touch in advance, the display function and the touch control function of the display panel are respectively realized in the display period and the touch control period. With reference to the timing charts in FIG. 6, STV is a frame start signal, CPV is a gate turn-on control signal, TP is a data turn-on signal, Gate is a turn-on signal for each gate line, Data is each column of data signal, TE is a touch control enable control signal, TX is a touch control driving signal, RX is a touch control detecting signal.

In the display period Display, both the touch control driving electrode and the common electrode are connected to the common voltage signal, the Gate signal is sequentially input to each row of gate lines from the first row downwards to turn on each row of pixels one by one, the data line sequentially outputs the corresponding data signal. In this way, the pixel electrode and the common electrode form an electric field to control the rotations of liquid crystals in the corresponding pixels so as to realize display.

The touch control period Touch of each image frame starts from the enabling of the TE signal. At this phase, the touch control driving electrode is connected to the touch control driving signal, the touch control detecting electrode is connected to the touch control detecting signal, and the common electrode is connected to the common voltage signal. At the moment, no signal presents on any of the gate lines, and no output exists on the data lines. It continues until the TE signal is switched off and the display period for the next image frame starts.

The time dividing driving method according to the embodiment of the invention (dividing the display period of an image frame into a display period and a touch control period) effectively prevents the touch control signals from interfering the display signal during the touch control period, thereby improving the display quality.

An embodiment of the invention provides a control device for display and touch control of the above display panel.

The control device comprises: a display control unit adapted to apply a common voltage signal to the touch control driving electrode without inputting signals to the touch control detecting electrode during the display period; and a touch control unit adapted to apply a touch control driving signal to the touch control driving electrode and control the touch control detecting electrode couples and outputs the voltage signal at the touch control driving electrode during the touch control period.

Furthermore, an embodiment of the invention further provides a display device comprising the above capacitive built-in touch control display panel.

The display device can further comprise the above control device adapted to control the display and touch control of the capacitive built-in touch control display panel.

In summary, in the capacitive built-in touch control display panel, the display device, the control device and control method according to the embodiments of the invention, the touch control driving electrode and the touch control detecting electrode are disposed on the array substrate. A portion of the common electrode layer on the array substrate is used as the touch control driving electrode. The touch control detecting electrode is disposed on the common electrode layer, and a passivation layer is disposed between the touch control driving electrode and the touch control detecting electrode. Moreover, the display function and touch control function of the display panel are realized in a time dividing manner. Since the position of the touch control detecting electrode corresponds to the black matrix region, no extra shielding is required. It can thus maintain the aperture ratio of the pixel structure. Since the common electrode having the gate line disposed therebelow is used as the touch control driving electrode during the touch control period, there is no need to fabricate the touch control driving electrode separately; thus saving the cost. Moreover, the touch control driving electrode and the touch control detecting electrode are disposed on the side of the TFT array substrate, which can facilitate to fan out the leads of the touch control detecting electrode and the touch control driving electrode, which in turn is beneficial for the bonding of the flexible print circuit.

A person of ordinary skill in the art will understand that the embodiments of the invention can be provided as a method, a system, or a computer program product. Therefore, the invention can be implemented in the form of pure hardware, pure software or software in combination with hardware. Moreover, the invention can be implemented in the form of computer program products realized on one or more computer readable storage medium (comprising but not limited to disk storage devices and optical storage devices) comprising computer executable program code.

The invention is described with reference to flow charts and/or block diagrams of the method, the device (system) and the computer program product in accordance with the embodiments of the invention. It can be understood that it can be realized with each and every flow and/or block in the flow charts and/or block diagrams for implementing the computer instructions and combinations of flow and/or block in the flow charts and/or block diagrams. The computer program instructions can be provided to a general purpose computer, a specific purpose computer, an embedded processor or processors in other programmable data processing devices to form a machine, such that a device for realizing functions specified in one or more flows in the flow charts and/or one or more blocks in the block diagrams is generated by instruction executed by a computer or a processor of other programmable data processing devices.

The computer program instruction can also be stored in computer readable storage devices that can boot the computer or other programmable data processing devices to work in specific manner, such that instructions stored in the computer readable storage device can generate products comprising an instruction device that realizes functions specified in one or more flows in the flow charts and/or one or more blocks in the block diagrams.

The computer program instructions can be loaded into a computer or other programmable data processing devices, such that a sequence of steps are executed in the computer or the programmable data processing devices to generated processes implemented by the computer, therefore providing functions specified in one or more flows in the flow charts and/or one or more blocks in the block diagrams in the computer or the programmable data processing devices.

The above description is related to the illustrative embodiments of the disclosure only and not limitative to the scope of the disclosure. The scope of the disclosure is defined by the appending claims.

What is claimed is:

1. A capacitive built-in touch control display panel, comprising an array substrate, a counter substrate and a liquid crystal layer, the array substrate comprising a gate line and a data line extending in different directions and crossing each other, the counter substrate comprising a color filter layer, the liquid crystal layer is interposed between the array substrate and the counter substrate, the array substrate further comprising:
a transparent common electrode extending along a first direction, positioned in a transparent common electrode layer, and the transparent common electrode only applied with a common voltage signal;
a touch control driving electrode extending along the first direction, the touch control driving electrode being positioned in the transparent common electrode layer wherein the touch control driving electrode and the transparent common electrode are distinct from each other;
a touch control detecting electrode extending along a second direction, the touch control detecting electrode being insulated from the touch control driving electrode by an insulation layer, wherein the touch control detecting electrode has a grid-like structure, and an orthographic projection of the touch control detecting electrode with the grid-like structure on the array substrate is completely within an orthographic projection of the black matrix region of the display panel on the array substrate; and
a metal electrode disposed above or under the touch control driving electrode and directly electrically connected to the touch control driving electrode;
wherein the first direction is perpendicular to the second direction, the common voltage signal and a touch control driving signal are applied to the touch control driving electrode in a time dividing manner; and
the metal electrode has a grid-like structure at a location corresponding to a black matrix region.

2. The capacitive built-in touch control display panel of claim 1, wherein the touch control driving electrode and the gate line extend in the same direction, and the touch control detecting electrode and the data line extend in the same direction.

3. The capacitive built-in touch control display panel of claim 1, wherein the touch control driving electrode and the gate line are extending in the same direction, and the touch control detecting electrode and the data line are extending in the same direction.

4. The capacitive built-in touch control display panel of claim 1, wherein
the transparent common electrode and the touch control driving electrode are not overlapped with each other in the second direction.

5. The capacitive built-in touch control display panel of claim 1, wherein
the touch control driving electrode and the touch control detecting electrode are provided at a same side of the liquid crystal layer; and
the color filter layer is provided at a side, which is different from the side at which the touch control driving electrode and the touch control detecting electrode are provided, of the liquid crystal layer.

6. A control device for realizing display and touch control functions of a capacitive built-in touch control display panel, the capacitive built-in touch control display panel comprising an array substrate, an counter substrate and a liquid crystal layer, the array substrate comprising a gate line and a data line extending in different directions and crossing each other, the counter substrate comprising a color filter layer, the liquid crystal layer is interposed between the array substrate and the counter substrate, wherein the array substrate further comprising:
a transparent common electrode extending along a first direction, positioned in a transparent common electrode layer, and the transparent common electrode only applied with a common voltage signal;
a touch control driving electrode extending along the first direction, the touch control driving electrode being positioned in the transparent common electrode layer wherein the touch control driving electrode and the transparent common electrode are distinct from each other;
a touch control detecting electrode extending along a second direction, the touch control detecting electrode being insulated from the touch control driving electrode by an insulation layer, wherein the touch control detecting electrode has a grid-like structure, and an orthographic projection of the touch control detecting electrode with the grid-like structure on the array substrate is completely within an orthographic projection of the black matrix region of the display panel on the array substrate; and
a metal electrode disposed above or under the touch control driving electrode and directly electrically connected to the touch control driving electrode;
wherein the first direction is perpendicular to the second direction, the common voltage signal and a touch control driving signal are applied to the touch control driving electrode in a time dividing manner, and
the metal electrode has a grid-like structure at a location corresponding to a black matrix region;
wherein a period for displaying each image frame by the display panel is divided into a display period and a touch control period,
the control device comprising:
a display control unit adapted to apply a common voltage signal to the touch control driving electrode without inputting signals to the touch control detecting electrode during the display period; and
a touch control unit adapted to apply a touch control driving signal to the touch control driving electrode and control the touch control detecting electrode couples and outputs the voltage signal of the touch control driving electrode during the touch control period.

7. A display device comprising the capacitive built-in touch control display panel comprising an array substrate, an counter substrate and a liquid crystal layer, the array substrate comprising a gate line and a data line extending in different directions and crossing each other, the counter substrate comprising a color filter layer, the liquid crystal layer is interposed between the array substrate and the counter substrate, wherein the array substrate further comprising:
a transparent common electrode extending along a first direction, positioned in a transparent common electrode layer, and the transparent common electrode only applied with a common voltage signal;

a touch control driving electrode extending along the first direction, the touch control driving electrode being positioned in the transparent common electrode layer wherein the touch control driving electrode and the transparent common electrode are distinct from each other;

a touch control detecting electrode extending along a second direction, the touch control detecting electrode being insulated from the touch control driving electrode by an insulation layer, wherein the touch control detecting electrode has a grid-like structure, and an orthographic projection of the touch control detecting electrode with the grid-like structure on the array substrate is completely within an orthographic projection of the black matrix region of the display panel on the array substrate; and a metal electrode disposed above or under the touch control driving electrode and directly electrically connected to the touch control driving electrode;

wherein the first direction is perpendicular to the second direction, the common voltage signal and a touch control driving signal are applied to the touch control driving electrode in a time dividing manner; and the metal electrode has a grid-like structure at a location corresponding to a black matrix region.

8. The display device of claim 7, wherein a period for displaying each image frame by the display panel is divided into a display period and a touch control period, and the display device further comprises a control device comprising:

a display control unit adapted to apply a common voltage signal to the touch control driving electrode without inputting signals to the touch control detecting electrode during the display period; and a touch control unit adapted to apply a touch control driving signal to the touch control driving electrode and control the touch control detecting electrode couples and outputs the voltage signal of the touch control driving electrode during the touch control period.

9. The display device of claim 7, wherein the touch control detecting electrode has a grid-like structure at a location corresponding to a black matrix region of the display panel.

\* \* \* \* \*